United States Patent [19]

Werner et al.

[11] 4,354,654
[45] Oct. 19, 1982

[54] SWIVEL MOUNTING UNIT

[75] Inventors: Franz Werner, Paderborn-Wewer; Rudolf Schmeykal, Neuenbeken; Herman Doeinghaus, Delbrueck-Hagen, all of Fed. Rep. of Germany

[73] Assignee: Nixdorf Computer AG, Fed. Rep. of Germany

[21] Appl. No.: 134,782

[22] Filed: Mar. 28, 1980

[30] Foreign Application Priority Data

Apr. 4, 1979 [DE] Fed. Rep. of Germany ... 7909786[U]

[51] Int. Cl.³ ............................................. F16M 1/00
[52] U.S. Cl. ................................................. 248/663
[58] Field of Search ............... 248/658, 663, 514, 515, 248/516; 403/123, 127, 143

[56] References Cited

U.S. PATENT DOCUMENTS

| 358,497 | 3/1887 | Stevens | 248/516 |
|---|---|---|---|
| 751,485 | 2/1904 | Eck | 248/663 |
| 2,500,784 | 3/1950 | Anderson | 403/123 |
| 3,145,005 | 8/1964 | Wester | 248/515 |
| 3,204,898 | 9/1965 | Manning | 248/516 |
| 4,036,459 | 7/1977 | Alexander | 248/663 |

Primary Examiner—Louis Rimrodt
Attorney, Agent, or Firm—Krass, Young & Schivley

[57] ABSTRACT

A mount for a projector or the like has a base with a convex spherical bearing element rotatably mounted therein and having a guide slot on the convex surface and a concave support rests thereon with a depending pivot pin disposed in a tapered aperture in the bearing and a projection fitting in the guide slot for limiting tilting of the support.

7 Claims, 6 Drawing Figures

Fig. 4
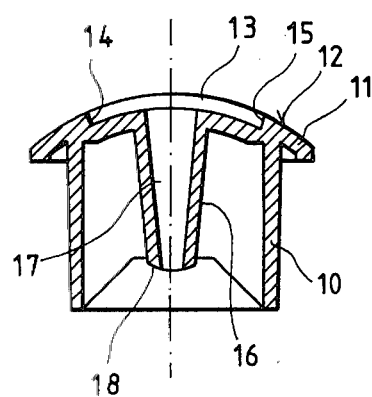
Fig. 5
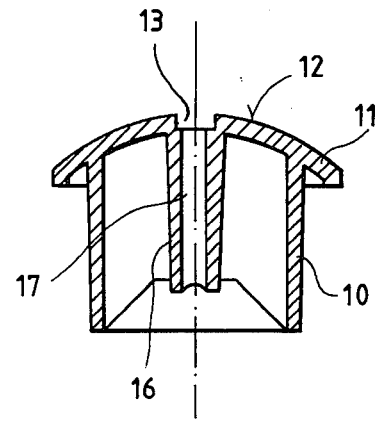
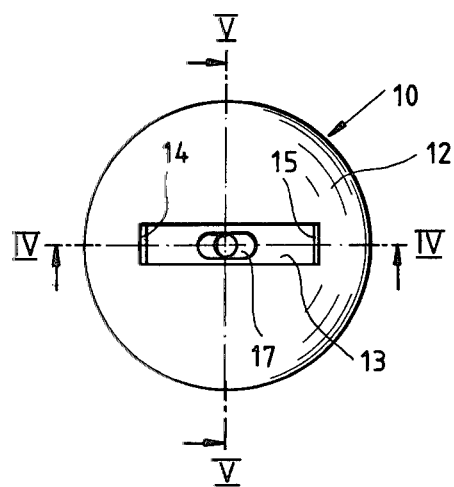
Fig. 6

SWIVEL MOUNTING UNIT

BACKGROUND OF INVENTION

Swivel mounts for picture projectors and the like generally incorporate substantial complexity and expensive swivel bearing elements as well as stopping or locking elements. Adjustable mounting means for apparatus of this type, for example, generally require means for controlled rotation of the apparatus on the mounting means about a vertical axis therethrough and also controlled tilting of the apparatus with respect to a horizontal plane.

The present invention provides a swivel mount wherein only a few simple support elements are required so as to minimize the space requirements and cost as well as minimizing maintenance problems. The present invention provides a continuously adjustable support without the necessity of special stopping or locking devices for maintaining the support in any desired position.

SUMMARY OF THE INVENTION

The swivel mounting unit of the present invention includes a convex spherical support surface on an upper end of a cylindrical bearing which is rotatably mounted about a vertical axis in a foot plate. A concave step bearing or support is mounted on the convex spherical support surface with a projection fitting into a guide slot therein. Apparatus such as a picture projector or the like is carried by this step bearing or support.

The present invention provides for spherical mating surfaces of substantial surface area so as to establish a substantial frictional engagement in order to preclude the necessity of providing separate stopping or locking elements for maintaining the support in adjusted inclined positions. The direction of relative movement of the parts of the present invention may be limited so that the support or step bearing can only move on the spherical bearing element in a single plane, forward or backward from vertical. The foregoing is accomplished in accordance herewith by the provision of a projection or guide arm on one of the spherical surfaces which slidably engages a guide slot on the other spherical surface. In this manner inadvertent lateral tilting of the apparatus carried by the present invention is precluded and also the degree of inclination from horizontal may be limited by appropriate location of the ends of the guide slot.

A very simple, practical structure in accordance with the present invention employs a bearing element which may be considered to be mushroom-shaped with the cylindrical stem thereof rotatably disposed in a foot plate.

The present invention furthermore provides a tapered aperture in the top of the bearing element which has a convex spherical upper surface. Within the tapered aperture there is provided a tension pin which extends from the upper support to a surface beneath the tapered aperture. This pin may, for example, be threaded at the bottom end with the spring disposed thereabout and a nut threaded on the pin to compress the spring. The upper end of the pin extends through or at least into engagement with the step bearing or support having the concave spherical surface thereof resting on the convex spherical surface of the spring element. In this manner the amount of friction at the mating spherical bearing surfaces may be adjusted. With the appropriate frictional engagement the projector or the like carried by the step bearing may be angularly adjusted and will remain in such position. The large bearing surface with a predetermined frictional engagement of the opposing parts thereof thus provides a swivel mounting requiring no locking means inasmuch as it is self locking in any swivel position, entirely free from play or slippage.

DESCRIPTION OF FIGURES

The present invention is illustrated as to a preferred embodiment thereof in the accompanying drawings, wherein:

FIG. 4 is a central vertical sectional view of the bearing element of the present invention taken in the plane IV—IV of FIG. 6;

FIG. 5 is a sectional view of the bearing element taken in a plane V—V of FIG. 6; and FIG. 6 is an enlarged top plan view of the bearing element of the present invention.

DESCRIPTION OF PREFERRED EMBODIMENT

Figure 1:
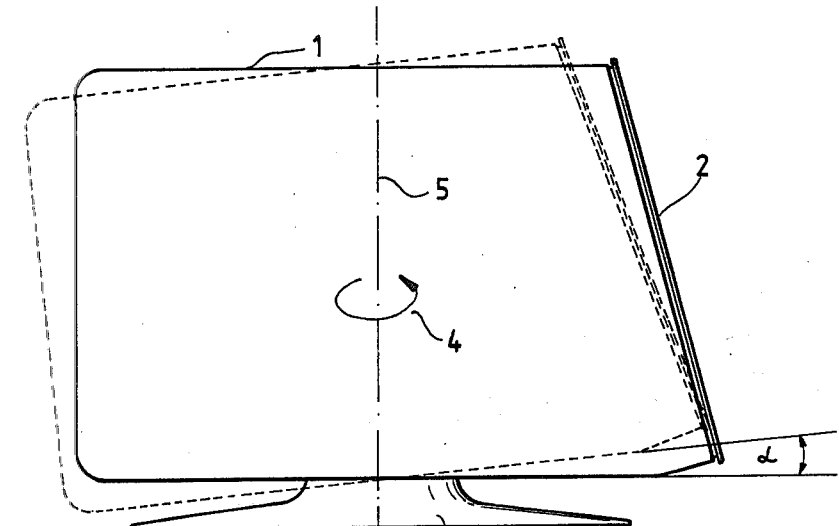
FIG. 1 is a side elevational view of a projector or the like mounted on the swivel bearing of the present invention and illustrating both a horizontal and inclined position of the projector.

Referring to FIG. 1 of the drawings, there will be seen to be shown a projection screen apparatus 1 having a viewing face 2 and mounted upon a swivel base or mounting unit 3 which is adapted to be placed upon a table top or the like. The present invention provides for tilting or swiveling the apparatus 1 from the horizontal position illustrated to an inclined position shown in dashes lines in FIG. 1. The invention provides for tilting or swivelling of the apparatus to an angle α. Additionally, the invention provides for turning or rotating the apparatus 1 about a vertical axis 5, as indicated by the arrow 4 into a desired swivel position.

Figure 2:
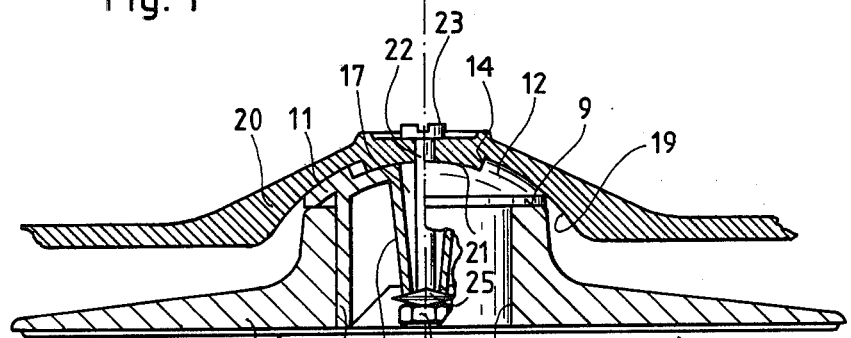
FIG. 2 is an enlarged central vertical sectional view of the swivel mounting of the present invention.
Figure 3:
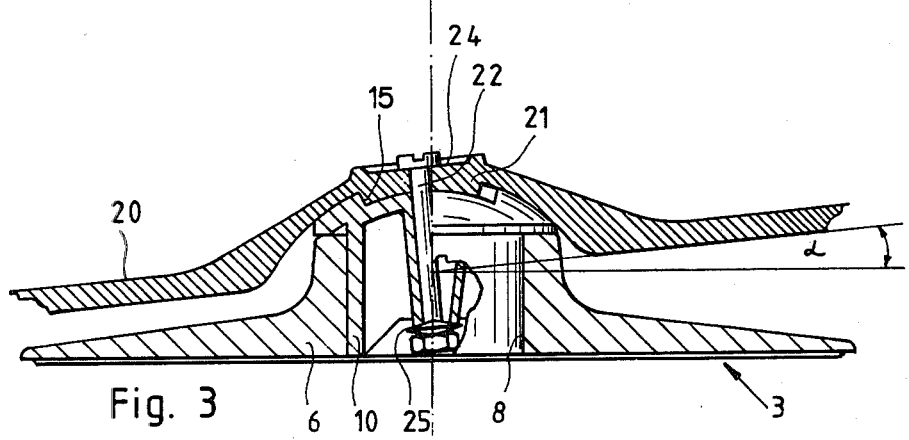
FIG. 3 is a view taken in the same plane as FIG. 2 and illustrating the mounting inclined at an angle alpha.

The swivel support or mounting 3 is illustrated in detail in FIGS. 2 and 3. The mounting unit has a foot plate 6 extending substantially outwardly from a central upright portion with a large base area 7 and a central vertical cylindrical opening 8 therethrough with a circular shoulder 9 about the top thereof. Within the central opening 8 there is disposed a mushroom-shaped bearing element 10 which is separately illustrated in FIGS. 4, 5 and 6. The bearing element 10 has a mushroom-shaped head 11 atop a hollow stem and the under surface of the head about the stem is adapted to rest on the circular rim 9 of the foot. The mushroom-shaped head of the bearing element has a convex spherical bearing surface 12 of predetermined frictional roughness and there is formed in this surface a narrow, elongated guide slot 13. The guide slot 13 extends across the center of the spherical surface 12 and terminates short of the edges of such surface at slot ends 14 and 15. The stem of the bearing element 10 is hollow, with an aperture or opening 17 through a projection 16 depending from the head.

The depending projection 16 terminates short of the bottom of the bearing element 10 and has a central, vertical opening or aperture 17 therethrough which tapers outwardly toward the top thereof. This aperture 17 communicates with the guide slot 13 in the upper spherical surface of the bearing element. The lower end of the projection 16 is formed as a convex spherical surface 18. The opening 17 will be seen in FIGS. 4, 5 and 6 to vary in shape from an oblong cross-sectional configuration at the top to a circular configuration at the bottom.

Considering further the swivel mount of the present invention as illustrated in FIGS. 2 and 3, there will be seen to be provided a step bearing or support 20 which may be directly connected to projection screen apparatus 1 and having on the underside thereof a spherical concave bearing surface 19 configured to mate with the spherical bearing surface 12 on the bearing element 10. A guide arm or projection 21 is provided on the concave bearing surface 19 and is dimensioned to slidably engage the guide slot 13 in the top of the bearing element 10. This guide arm 21 has a shorter length than the length of the guide slot 12 with the difference in length being predetermined to accommodate the desired angle or inclination α of the support with respect to horizontal. The swivel mount, as illustrated in FIG. 2, shows the guide arm 21 abutting the forward end 14 of the guide slot with the support in horizontal position. This slot 13 extends further to the rear of the mount from the central vertical axis 5 than it does forwardly therefrom. Consequently, the support 20 may be tilted, as indicated in FIG. 3, to move the guide arm 21 into engagement with the rear slot end 15. This arrangement provides for limited tilting or inclining of the apparatus 1 through the angle α.

There is also illustrated in FIGS. 2 and 3 a tension pin 22 which may be provided in the form of a bolt having a bolt head 23 disposed atop the support 20 upon a surface 24 thereof with the pin extending through the support 20 and through the aperture 17 in the bearing element 10 beyond the curved surface 18 of the lower end of this aperture. At the bottom end of the pin or bolt 22 beneath the projection 16 there are provided a pair of cup-shaped disc springs 25 disposed in facing relation to each other about the lower end of the bolt and a nut 26 is threaded on the end of the bolt to compress the springs against the curved surface 18. It will be appreciated that the tapered configuration of the aperture 17 allows the pin 22 to be pivoted therein as indicated in FIG. 3. The cup springs 25 are compressed between the nut 25 and curved surface 18 at the lower end of the projection 16 and clearly the pressure applied to the mating spherical surfaces 12–19 is adjustable by the nut 26. The tension pin 22, with the springs thereabout operate not only to establish the degree of frictional engagement between the spherical surfaces of the bearing element 10 and support 20, but also accommodates any loosening of this engagement which might otherwise occur during frequent manipulation of the swivel mount. The upper spring of the pair 25 thereof serves as a gliding surface on the spherical surface 18.

The above-described arrangement of the present invention will be seen to provide, not only for a predetermined limited controllable inclination of the support 20 from a horizontal plane through a maximum angle α, but also for maintaining any adjusted inclination. As previously noted, the swivel mount also provides for angularly adjusting the support 20 about a vertical axis 5 by rotation of the bearing element 10 in the bearing aperture 8 of the foot plate 6. In this respect it is also possible to provide for limiting this rotary motion, if desired. The elements of the swivel mount of the present invention may be formed of a variety of different materials, including metal or plastics, or combinations thereof.

The present invention has been described above with respect to a single preferred embodiment thereof; however, it will be apparent to those skilled in the art that numerous modifications and variations may be made within the spirit and scope of the present invention and thus it is not intended to limit the invention to the precise terms of description or details of illustration.

What is claimed is:

1. A swivel mount for apparatus such as a projector adapted for angular adjustment about a vertical axis and adjustment of inclination from horizontal characterized by:
   a foot plate having a vertically cylindrical opening therein;
   a bearing element having a hollow cylindrical portion mounted in said opening of said foot plate for angular movement about a vertical axis relative to said foot plate and having an upper convex spherical support surface with a guide slot therein, and
   a step bearing adapted to mount apparatus and having a concave under surface disposed in mating frictional engagement with said spherical support surface and further having a guide arm disposed in said guide slot to limit angular tilting or inclination of said apparatus to a single plane.

2. The swivel mount of claim 1 further characterized by said guide slot having end stops for engagement with said guide arm which has a length that is less than the length of said guide slot for limiting inclination of the supported apparatus to a predetermined maximum angle from horizontal.

3. The swivel mount of claim 1 further characterized by said bearing element having a mushroom shape with a semispherical head portion extending laterally beyond a cylindrical depending stem portion to define a shoulder thereabout and said foot plate having an annular rim about the upper edge of a vertical bearing element opening and engaging said shoulder about said bearing element for supporting said bearing element.

4. A swivel mount as defined in claim 3 further characterized by
   said bearing element having a longitudinal opening tapering inwardly from the center of said spherical support surface downwardly to a lower spherical surface disposed above the bottom of said foot plate, and
   a tension pin connected at an upper end to said step bearing and extending through the longitudinal opening in said bearing element with a flanged lower end bearing upon said lower spherical surface for drawing said concave step bearing surface into predetermined frictional engagement with said spherical support surface of said bearing element.

5. The swivel mount of claim 4 further characterized by said bearing element having a hollow interior with a projection depending from said head into said stem and terminating short of the end of said stem in said convex lower spherical surface and the longitudinal opening in said bearing element changing continuously from an oblong upper configuration at said guide slot to a circular configuration at said lower spherical surface.

6. The swivel mount of claim 4 further characterized by said tension pin comprising a bolt extending through said step bearing with a bolt head above same and a shank extending through said longitudinal bearing element opening with a nut threaded thereon below said lower spherical surface and a cup spring disposed about said shank between said nut and lower spherical surface for adjusting tension of said pin to adjust the frictional forces between engaging surfaces of said step bearing and bearing element to provide a self locking inclining mount.

7. A mount for a display apparatus which allows vertical rotation and limited inclination adjustment of said apparatus comprising:
   a foot plate adapted to rest on a bearing surface and having a vertically oriented central cylindrical opening;
   a bearing element having a cylindrical lower portion removably disposed within said opening for rotation relative thereto;
   said bearing element further having a spherical upper convex support surface within which is formed a guide slot and a vertical aperture;
   a step bearing adapted to carry said apparatus and having a concave spherical under surface disposed in mating relationship over the spherical support surface of the bearing element and having a guide arm in said slot to limit the degree of relative movement between the step bearing and the bearing element to a single plane; and
   fastener means connecting the step bearing and the bearing element via said aperture to adjust the friction between said mating surfaces without affecting either rotation between the bearing element and the foot plate or the removability of the bearing element from the foot plate.

* * * * *